June 9, 1964     R. J. MELTZER     3,136,310
OPTICAL CATHETER
Filed Jan. 18, 1960
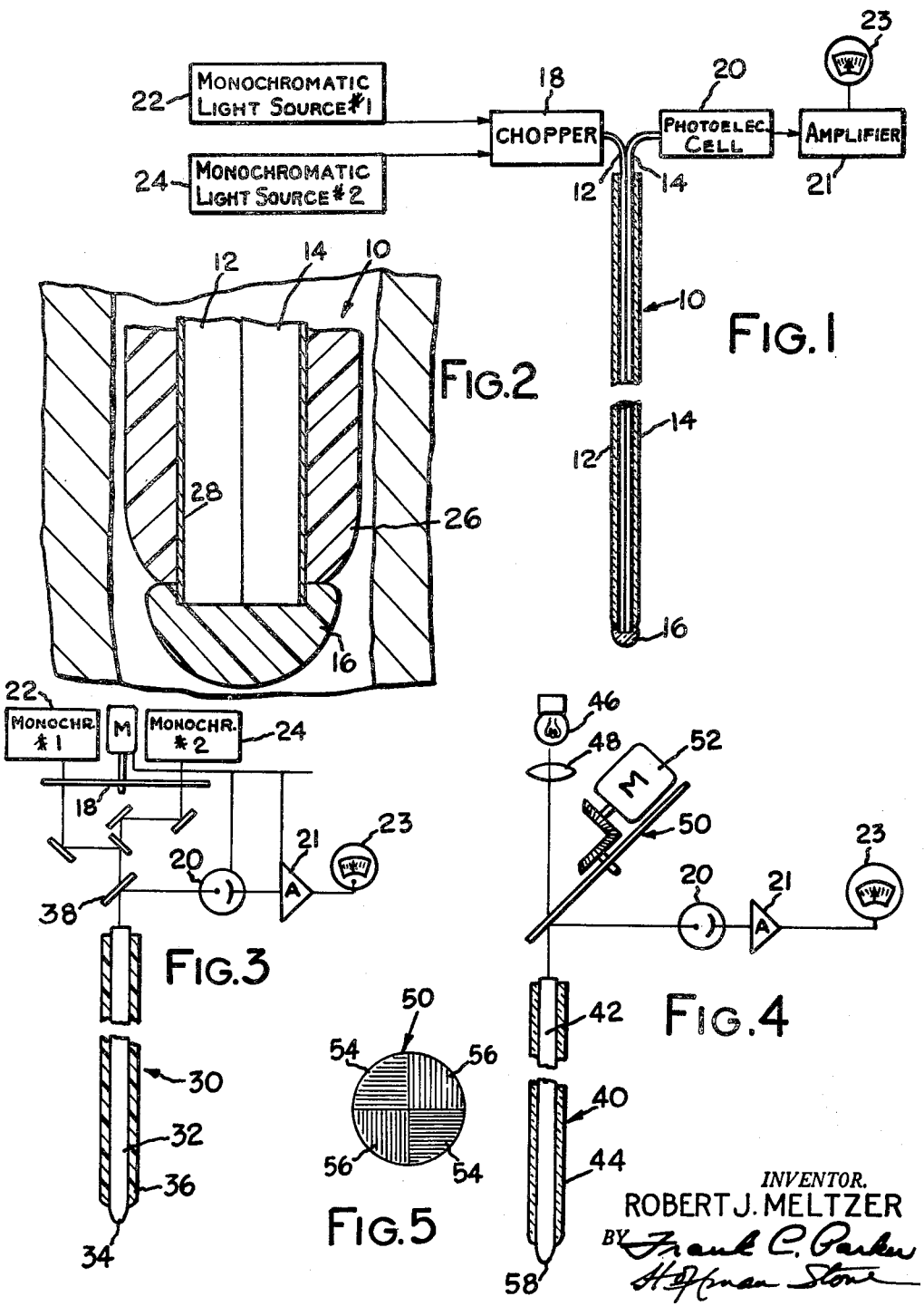
INVENTOR.
ROBERT J. MELTZER
BY
ATTORNEYS

United States Patent Office

3,136,310
Patented June 9, 1964

3,136,310
OPTICAL CATHETER
Robert J. Meltzer, Irondequoit, N.Y., assignor to Bausch & Lomb Incorporated, a corporation of New York
Filed Jan. 18, 1960, Ser. No. 3,073
2 Claims. (Cl. 128—2)

This invention relates to an improved optical catheter of relatively small size and having a relatively high degree of flexibility so that it may be inserted into a blood vessel of moderate size for measuring a selected optical characteristic of blood flowing in the vessel.

Many medical diagnoses depend upon measurement of various blood conditions, certain ones of which can be determined by optical means such as, for example, colorimetry. Heretofore it has usually been necessary to remove a portion of the blood from the patient's body for measurement purposes, and it has not been possible to make measurements of the blood as it courses through a blood vessel relatively deep within the body.

Accordingly, one important object of the invention is to provide an improved optical catheter which is flexible and of relatively small size so that it may be inserted into a blood vessel for observation of the blood in its natural environment.

Another object is to provide an improved oximeter for measuring the oxygen content of blood as it flows within the body.

A further object is to provide a device of this character that is of relatively simple construction, reliable in operation, and easy to use.

The foregoing and other objects and advantages of the invention will become apparent in the following description of a representative embodiment thereof taken in conjunction with the drawing wherein:

FIGURE 1 is a partly schematic view showing a catheter according to the invention together with associated colorimetric equipment, the combination being arranged for use as an oximeter;

FIGURE 2 is a fragmentary sectional view showing the catheter portion of the oximeter within a blood vessel;

FIGURE 3 is a diagrammatic view of an oximeter apparatus including a catheter according to a second embodiment of the invention;

FIGURE 4 is a diagrammatic view of an oximeter according to a third embodiment of the invention and including a catheter generally similar to the catheter shown in FIGURE 3; and, FIGURE 5 is an elevational view of the light filter of the apparatus shown in FIGURE 4.

As a result of relatively recent developments in the field now known as fiber optics, it is now possible to make relatively small diameter, flexible, light conducting instruments such as endoscopes for medical use for observing hitherto inaccessible cavities in the body. Instruments of this type generally comprise one or more bundles of elongated, flexible, light conducting members, each one of which is capable of conducting light from one end to the other because of the effect known as total internal reflection. The individual elements may be made of glass, and are of relatively small diameter such as about 10 to 100 microns in order to make them sufficiently flexible, and to restrict the size of the bundle of light rays in each element, thereby permitting the elements to be bent relatively sharply without danger of the rays escaping through the surface of the elements.

The present invention makes use of the advantages of fiber optics to provide a catheter for use as the sensing portion of an oximeter, the catheter being highly flexible and sufficiently small in cross section to be inserted into the blood vessel system of the human body for measuring the oxygen content of the blood in its natural environment.

Referring now to the drawing, the catheter 10 shown in FIGURES 1 and 2 thereof represents a preferred embodiment of the invention, and comprises at least two relatively small diameter, elongated light conductors 12 and 14, which may be glass fibers about 10 to 100 microns in diameter each. At one end the conductors 12 and 14 are embedded in the base of a generally hemispherical plastic tip 16. Alternatively the conductors 12 and 14 may be fused together and their ends melted to form a ball-like tip in place of the plastic tip 16. However, it is presently thought that best results are obtained when the conductors 12 and 14 are embedded in a liquid plastic material which is then caused to congeal around the conductors.

At their opposite ends, the conductors 12 and 14 are connected, respectively, to the output of a light chopper 18, and to the input of a photoelectric sensing device 20. If the catheter includes a relatively large number of light conductors, approximately one-half of them are connected to the light chopper 18, and the other half to the sensing device 20. The conductors may be arranged as an incoherent group, or bundle, that is, there is no required relationship between the relative positions of the conductors at the opposite ends of the catheter.

The chopper 18 is part of conventional oximetric apparatus. It receives light from two monochromatic light sources 22 and 24, and transmits light from the two sources alternately to the first conductor 12. The first conductor transmits the light so received to the transparent plastic tip 16 for illuminating the blood surrounding the tip. The second conductor 14 receives light reflected from the blood and transmits the reflected light to the photoelectric device 20, which constitutes part of the photometric portion of conventional oximetric apparatus. The electric signal produced by the photo cell 20 is amplified and modified by an amplifier 21 to produce an output signal indicative of color changes of the blood, which output signal may be fed to any desired indicating device 23.

The conductors 12 and 14 are enclosed over most of their length, and protected by a flexible tube 26, which may be of rubber, synthetic plastic, or any other desired material that is compatible with the blood and surrounding tissues. One end of the tube 26 is located approximately at the rear edge of the tip 16 so as to expose as large a surface portion as possible of the tip 16 to its surrounding medium, while still protecting the conductors 12 and 14. If desired, the tube 26 may be bifurcated at its end opposite from the tip 16 so as to extend over the two conductors for substantially their full length.

The overall diameter of the tube 26 may be made relatively small such as, for example, about 2.5 mm. or less, so that the catheter may be inserted into relatively small blood vessels. In the usual case, the conductors 12 and 14 are flexible and non-resilient, and the tube 26 is preferably made sufficiently resilient to provide the strength required for inserting the catheter and pushing it along within the blood vessel system. If desired, a reinforcing wire (not shown) may also be included within the tube 26 for added resilience and strength, in which case, the tube wall may be made thinner than otherwise.

It is also desired to follow the progress of the catheter as it is inserted. This can best be done by fluoroscope or other X-ray devices, and toward this end, the catheter preferably includes means for rendering it clearly visible under X-ray illumination. Such means may be constituted by a relatively short length of lead foil 28 wrapped around the light conductors 12 and 14 immediately adjacent to the tip 16 and within the tube 26. Alternately, a relatively fine lead wire (not shown) may be included in the catheter, extending for any desired length within the tube 26, or the tube 26 may include a barium compound as a filler ingredient thereby rendering the tube itself relatively opaque to X-radiation, and so clearly visible on the fluoroscope with a high degree of contrast.

In operation, an incision is made in a blood vessel and the catheter is inserted through the incision and manipulated by the surgeon until the tip 16 arrives at the desired location in the blood vessel system. Blood flowing through the vessel passes over the surface of the tip 16, and reflects light back into the tip for color measurement as hereinabove described.

In effect, the catheter 10 of the present invention takes the place of the ordinary sample cell in a conventional oximeter of the reflection measuring type. The catheter 10 functions as a small diameter, flexible, optical extension so that the sample cell of the oximeter may be constituted by a blood vessel deep within the patient's body, thereby permitting continuous observation, or monitoring of blood characteristics during protracted periods of time such as, for example, during surgery. The catheter may be made relatively long, whereby many portions of the body may be reached that were heretofore accessible only through radical surgery.

The catheter 30 shown in FIGURE 3 represents a second embodiment of the invention, and includes only one elongated light conductor 32, which transmits light in both directions, to and from the tip 34. In this instance, the tip 34 is preferably constituted by the light conductor material itself, and if the conductor 32 is made up of a plurality of relatively small diameter fibers, their ends are preferably cemented or fused together to prevent fraying. The conductor 32 is protected by a covering tube, or sheath 36, which is preferably relatively resilient to provide the strength required by the surgeon, and which is also relatively opaque to X-radiation.

The catheter 30 is used in conjunction with a beam splitter 38, which transmits light pulses from the two monochromators 22 and 24 and the chopper 18 into the conductor 32, and reflects the light emerging rearwardly from the conductor 32 towards the photosensitive pick-up device 20. The electrical signal produced by the photosensitive pick-up device 20 is then amplified and modified by the amplifier 21 and fed to the indicating device 23 in the usual manner.

The catheter 40 illustrated in FIGURE 4 includes a light conductor 42 enclosed within a protective tube or sheath 44. In the embodiment shown, the light conductor 42 is a glass fiber and the protective sheath 44 is of glass fused to the conductor 42 to provide an integral resiliently flexible structure. The sheath 44 is made of a material having a lower refractive index than the material of the conductor 42 in order to preserve the total internal reflectance of light within the conductor. The sheath 44 protects the outer surface of the conductor 42 from chemical attack by the blood, which might tend to roughen the surface and adversely affect the light transmitting ability of the conductor.

As shown, the catheter 40 is used illustratively with a somewhat different type of optical "feed-in" system than the system shown in the preceding figures. A single, broad spectrum, continuously energized light source 46 is arranged with a convergent lens 48 for directing light toward the input end of the conductor 42. A segmented filter 50, which acts also as a beam splitter is rotatably mounted between the light source 46 and the catheter 40. A motor 52 is drivably connected for rotating the filter 50 at any desired speed. The filter 50 includes two or more segments 54 and 56 of different respective light transmission characteristics so that as it is rotated in front of the input end of the conductor 42, the conductor receives successive pulses of light of different respective colors. The single light source, in conjunction with the segmented filter 50 takes the place of the two monochromators 22 and 24 and the chopper 18 described in connection with the embodiment shown in FIGS. 1, 2, and 3. Light reflected from the blood surrounding the tip 58 of the conductor 42 travels along the conductor, emerges at the rear end thereof, and is reflected by the filter disc 50 to the photo cell 20, which produces an electrical signal as hereinabove described.

What is claimed is:

1. An optical catheter comprising an elongated bundle of flexible light conducting fibers, illumination means directing light forwardly in a first portion of said bundle of light conducting fibers, a light sensing means receiving a light signal from a second portion of said bundle of light conducting fibers, a protective sheath disposed around said bundle of light conducting fibers, a tip defining a ball-like major surface so constructed and arranged that light from said first portion of said bundle of fibers is directed on the ball-like surface and light is retro-reflected to the second portion of said bundle of fibers, said tip including a base surface engaging the end surface of said bundle of light conducting fibers and forming a light transmitting interface, said ball-like surface thereby operating in a manner similar to an integrating sphere for reflecting a light signal responsive to illumination of the fluid surrounding said tip.

2. An optical catheter comprising an elongated bundle of flexible light conducting fibers, a first portion of said bundle of light conducting fibers transmitting light forwardly in said bundle of fibers, a second portion in said bundle of fibers transmitting a light signal rearwardly in said bundle of fibers, a light gathering and dispersing tip defining a generally hemispherically shaped major surface so constructed and arranged that light from said first portion of said bundle of light conducting fibers is directed on the hemispherical surface and reflected to the second portion of said bundle of fibers, said tip including a base surface abutting the end surface of said bundle of light conducting fibers and forming a light transmitting interface, said hemispherical surface thereby forming a retroreflecting surface reflecting a light signal to said second portion of said light conducting fibers responsive to illumination from said first portion of said bundle of fibers.

References Cited in the file of this patent

UNITED STATES PATENTS

| | | |
|---|---|---|
| 998,310 | Wappler | July 18, 1911 |
| 1,751,584 | Hansell | Mar. 25, 1930 |
| 2,790,438 | Taplin | Apr. 30, 1957 |
| 2,825,260 | O'Brien | Mar. 4, 1958 |
| 2,857,915 | Sheridan | Oct. 28, 1958 |
| 2,877,368 | Sheldon | Mar. 10, 1959 |
| 2,932,294 | Fourestier | Apr. 12, 1960 |
| 3,068,739 | Hicks et al. | Dec. 18, 1962 |

FOREIGN PATENTS

| | | |
|---|---|---|
| 1,123,371 | France | June 11, 1956 |